April 8, 1941.  J. A. ZUBLIN  2,237,538
SWEDGE
Filed Feb. 25, 1939
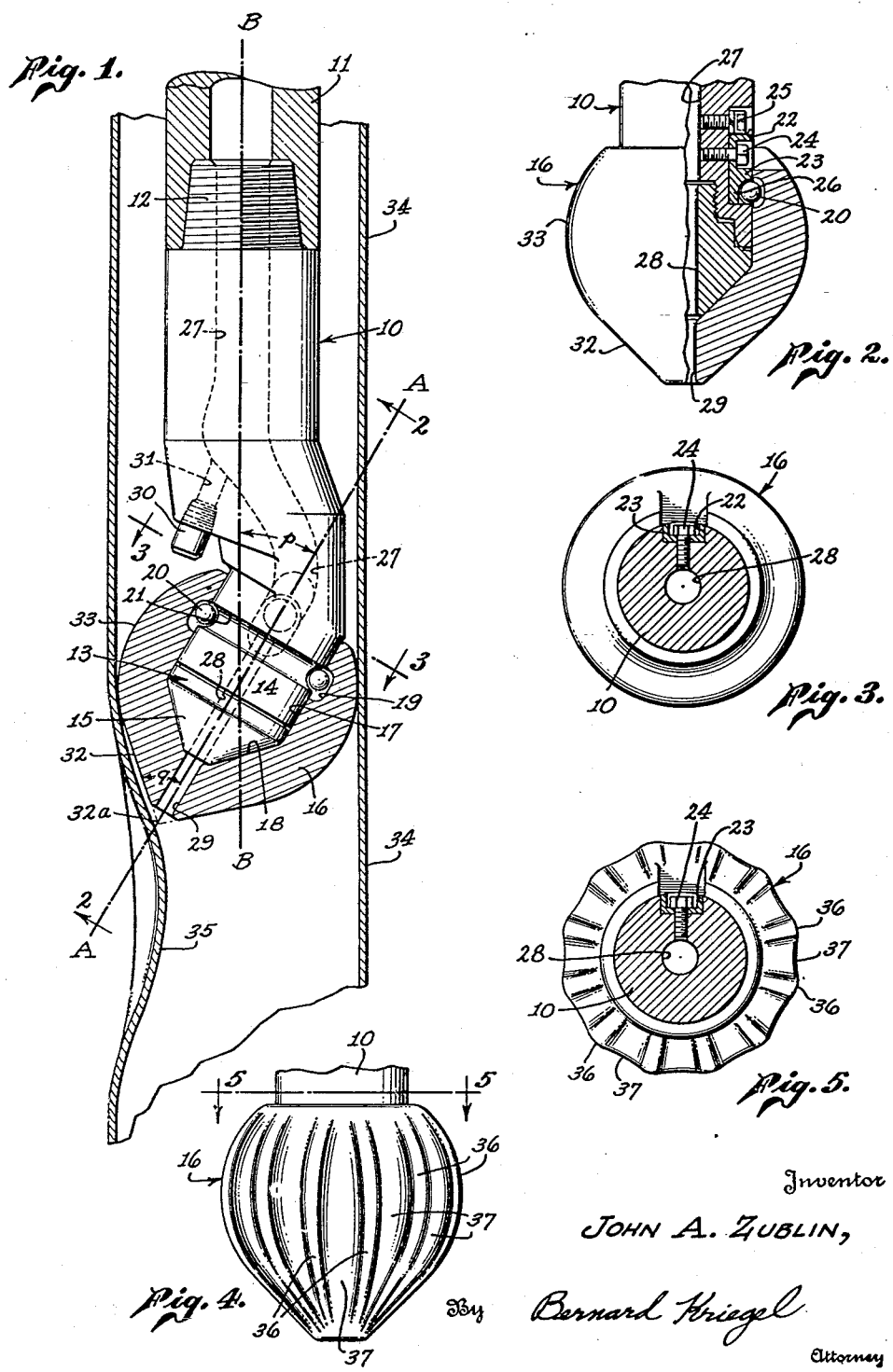
Inventor
JOHN A. ZUBLIN,
By Bernard Kriegel
Attorney Patented Apr. 8, 1941

2,237,538

UNITED STATES PATENT OFFICE 2,237,538

SWEDGE

John A. Zublin, Los Angeles, Calif.

Application February 25, 1939, Serial No. 258,438

4 Claims. (Cl. 153—81)

The present invention relates to a swedge or casing roller, being particularly directed to a tool adapted for operation within well casings and liners.

It is an object of this invention to provide an improved swedge for restoring buckled, dented or collapsed casings and liners to their original inside diameters.

A further object of the invention is to provide a swedge having a combined rotary and reciprocating or oscillating motion.

Still another object of the invention is to provide a swedge of sturdy and relatively simple construction, insuring safety in its use and dependability in its performance.

This invention possesses many other advantages and has other objects that will become apparent from a consideration of several embodiments of the invention. Accordingly, forms are shown in the drawing accompanying and forming part of the present specification, which forms will now be described in detail, illustrating the general principles of the invention. However, it is to be understood that this detailed description is not to be taken in a limited sense, since the scope of the invention is best defined by the appended claims.

Referring to the drawing:

Figure 1 is a side elevation of a swedge, with the swedge roller shown in section;

Figure 2 is a partial section taken on the line 2—2 of Figure 1;

Figure 3 is a transverse section taken on line 3—3 of Figure 1;

Figure 4 is a side elevation of a swedge with a modified form of roller; and

Figure 5 is a section taken on line 5—5 of Figure 4.

A completely assembled swedge is disclosed in Figure 1, including a supporting member or shank portion 10 attachable to the lower end of a string of drill pipe 11 through the agency of a tapered, threaded pin 12 provided on the upper end of the shank. The lower end of the shank is provided with a swedge roller bearing 13 whose axis A—A is inclined with respect to the axis B—B of the shank and hole or casing within which the tool is operable. The inclined bearing 13 consists of a cylindrical portion 14 for transmitting radial loads, and a terminal frusto-conical thrust portion 15 designed to carry substantially all of the axial loads and part of the radial loads. These bearing portions can be made integrally with the shank, but since the major portion of the wear occurs on the frusto-conical portion 15, it is preferred to make this part removable and replaceable by threadedly securing it within the cylindrical bearing portion 14.

A swedge roller 16, designed for operation upon casings, liners and the like, is rotatably mounted upon the inclined bearing 13, and is provided with an internal cylindrical bearing surface 17 and an internal frusto-conical bearing surface 18 respectively cooperable with the cylindrical and frusto-conical surfaces on the inclined bearing. The inside of the cutter is also provided with a groove or raceway 19 adapted to receive retainer or bearing elements, such as balls 20, which are also contained within an external circumferential groove or raceway 21 provided in the cylindrical portion 14 of the bearing. The swedge roller 16 is therefore prevented from moving downwardly from the shank and its bearing by the locking action of the balls. Upward movement is restrained and restricted by the cooperation between the frusto-conical bearing surfaces 15, 18.

The balls 20 are inserted into the raceways 19, 21 through a longitudinally extending recess 22 in the shank bearing communicating with the bearing raceway 21. After the swedge roller has been placed in proper position upon the inclined bearing, the balls 20 are inserted into the complementary raceways 19, 21 through the recess 22, after which they are confined within the raceways by a plug or lock 23 held within the recess by means of a screw 24 extending therethrough and threaded into the body of the shank. As a precautionary measure, a safety screw 25 can be threaded into the shank immediately above the lock to insure against its removal. The lower end 26 of the lock is suitably curved to afford continuity of the raceway in the bearing.

The manner of locking the roller to the shank and the general mode of cooperation between the bearing surfaces is fully described and claimed in my Patent No. 2,025,259, patented December 24, 1935, entitled "Drill bit," to which attention is invited.

The shank is provided with a passageway 27 for drilling fluid, which flows therethrough into a passage 28 in the inclined bearing pin 15, communicating with a hole or passageway 29 extending through the lower portion of the swedge roller, permitting circulating fluid to remove formation and other particles of matter from the casing, and thereby allow unimpeded operation of the swedge. A supplementary fluid discharge nozzle 30 is also threaded into the shank, and communicates with a passageway 31 opening into the main shank passageway 27. Fluid issuing from this nozzle will act upon the outer surfaces of the swedge roller and maintain them free from foreign matter.

As disclosed in the drawing, the swedge roller 16 is of generally conoidal shape with a lower portion 32 tapering downwardly toward a theoretical point 32a, and with an upper portion 33 of generally curved shape, preferably forming part of a spherical surface. The spherical surface merges into the tapered surface, preferably at the greatest diameter of the sphere, resulting in a roller having a substantially continuous outer surface, capable of effective operation within a casing.

Referring to Figure 1, a casing 34 is disclosed with a buckled or collapsed section 35 therein. The swedge is lowered within the casing to the defective region, and the shank 10 is rotated through the usual drill pipe 11 and other instrumentalities. Due to the angle p at which the bearing is inclined relatively to the axis or center line B—B of the shank, the roller 16 is given a wobbling or gyratory motion, which motion is a combination of a rotary movement upon the inclined bearing coupled with a reciprocatory or oscillatory movement of the roller generally transversely of the casing. Suitable weight is applied to the swedge, causing its roller 16 to contact with the defective casing portion 35. As the swedge rolls around the casing and oscillates therein under the influence of rotation of the shank and its inclined bearing, the buckled casing portion will be gradually and smoothly pressed back toward its original shape and size. If the buckling is relatively slight, the upper portion 33 of the tapered roller part and the spherical portion will be effective in forcing the bent casing part back into place. But if the buckling is material, or if undue resistance is offered by it, the smaller nose 32 of the roller will first operate upon the casing, its reciprocation or oscillation bending the defective portions laterally outwardly, permitting the rolling action to re-form it smoothly into its original smooth shape. As this original shape is being restored, the swedge will be lowered further into the casing to provide a progressively larger roller diameter for rolling purposes upon the deformation. When the roller can pass freely through the casing, the bore will have been restored to its initial inside diameter, or whatever lesser diameter is desired.

In a preferred design of the swedge roller, its maximum diameter at right angles to its inclined axis of rotation A—A is no greater than the inside diameter of the casing or liner within which it is to operate. This diameter can be the maximum diameter of the upper spherical portion 33 of the outer roller surface. From the largest roller diameter, the outer roller surface tapers downwardly, as aforementioned. This taper can be such as to provide a terminal frustoconical outer surface 32, although it is to be appreciated that other conoidal shapes can be used, since it is not essential that the tapered surface be part of a right circular cone. The degree of taper is also preferably such that one-half of the apex angle q of the cone is greater than the angle of inclination p of the rotational axis A—A of the roller with respect to the casing or shank axis B—B. This design is preferred in order that the tapered surface 32 will be inclined inwardly toward the axis of the hole B—B to permit it to be positioned initially below the uppermost portion of the deformation, and thereby allow the gyratory motion of the roller to be effective in pressing and rolling the casing back to its original shape.

The mounting of the roller for rotation about the inclined axis B—B provides a large mechanical advantage between the shank 10 and the roller 16, making it possible for the roller to exert a larger force upon the casing. This mechanical advantage arises from the fact that the transmission ratio between the revolutions of the shank within the casing and the revolutions of the roller upon the inclined bearing is much greater than one. It has been found that the inclining of the bearing 30 degrees to the shank axis will provide a transmission ratio of about 6 to 1, depending upon the degree of slip. Of course, this ratio and the mechanical advantage could be further increased by pitching the inclined axis more steeply, as, for example, making the angle of inclination 20 degrees.

A slightly modified form of swedge roller is disclosed in Figures 4 and 5. It is not essential that the outer surfaces 32, 33 of the roller 16 be perfectly smooth, as is disclosed in Figure 1. The roller can be provided with slightly raised longitudinal portions or ribs 36, preferably merging smoothly into shallow longitudinal grooves 37, forming, in effect, a very shallow and slightly corrugated surface. This type of surface is substantially continuous and is of generally conoidal shape, producing a knuckling or kneading action upon the casings and liners to form them into the desired shapes. The shallow groove 37 also permits the drilling fluid and foreign matter carried therein to pass upwardly past the roller from the lower casing regions.

I claim:

1. A swedge adapted to be lowered to a point remote from the surface in a casing set in a well including a shank rotatable about the axis of the casing, and a conoidal roller mounted on said shank for rotation about an inclined axis fixed with respect to said shank, said roller closely fitting the interior of the casing and forming the sole support of said roller and shank against transverse movement in the casing.

2. A swedge adapted to be lowered to a point remote from the surface in a casing set in a well including a shank rotatable about the axis of the casing, and a roller mounted on said shank for rotation about an inclined axis fixed with respect to said shank, said roller being of generally conoido-spherical shape tapering in one direction toward its axis from a maximum diameter at right angles to the roller axis, said roller being generally spherical in the opposite direction, the spherical portion of said roller closely fitting the interior of the casing and forming the sole support of said roller and said shank against transverse movement in the casing.

3. A swedge adapted to be lowered to a point remote from the surface in a casing set in a well including a shank rotatable about the axis of the casing, and a conoidal roller mounted on said shank for rotation about an inclined axis fixed with respect to said shank, one half of the apex angle of said conoid being greater than the angle of inclination of the axis of said roller, said roller closely fitting the interior of the casing and forming the sole support of said roller and shank against transverse movement in the casing.

4. A swedge adapted to be lowered to a point remote from the surface in a casing set in a well including a shank rotatable about the axis of the casing, and a roller mounted on said shank for rotation about an inclined axis fixed with respect to said shank, said roller being of generally conoido-spherical shape tapering in one direction toward its axis from a maximum diameter at right angles to the roller axis, one half of the apex angle of said tapered portion being greater than the angle of inclination of the axis of rotation of said roller, said roller being generally spherical in the opposite direction, the spherical portion of said roller closely fitting the interior of the casing and forming the sole support of said roller and shank against transverse movement in the casing.

JOHN A. ZUBLIN.